US011993075B2

(12) United States Patent
Takezawa et al.

(10) Patent No.: US 11,993,075 B2
(45) Date of Patent: May 28, 2024

(54) TRANSPORTING DEVICE AND IMAGE FORMING DEVICE

(71) Applicant: KYOCERA Document Solutions Inc., Osaka (JP)

(72) Inventors: Mashio Takezawa, Osaka (JP); Yuki Tamura, Osaka (JP)

(73) Assignee: Kyocera Document Solutions, Inc., Osaka (JP)

( * ) Notice: Subject to any disclaimer, the term of this patent is extended or adjusted under 35 U.S.C. 154(b) by 553 days.

(21) Appl. No.: 17/277,747

(22) PCT Filed: Sep. 13, 2019

(86) PCT No.: PCT/JP2019/036100
§ 371 (c)(1),
(2) Date: Mar. 19, 2021

(87) PCT Pub. No.: WO2020/066694
PCT Pub. Date: Apr. 2, 2020

(65) Prior Publication Data

US 2021/0347187 A1 Nov. 11, 2021

(30) Foreign Application Priority Data

Sep. 26, 2018 (JP) ................................ 2018-180723

(51) Int. Cl.
*B41J 15/16* (2006.01)
*B41J 2/01* (2006.01)
(Continued)

(52) U.S. Cl.
CPC ................ *B41J 15/16* (2013.01); *B41J 2/01* (2013.01); *B65H 5/06* (2013.01); *B65H 23/188* (2013.01)

(58) Field of Classification Search
CPC ..... B41J 15/16; B41J 15/165; B65H 23/1888; B65H 23/16; B65H 23/1955; B65H 23/1825; B65H 5/06
See application file for complete search history.

(56) References Cited

U.S. PATENT DOCUMENTS

2017/0282612 A1* 10/2017 Takahashi .............. B41J 13/076
2019/0315588 A1* 10/2019 Amari .................... B65H 23/16
(Continued)

FOREIGN PATENT DOCUMENTS

JP 2005-67105 3/2005

OTHER PUBLICATIONS

International Search Report of Nov. 19, 2019.

*Primary Examiner* — Luis A Gonzalez
(74) *Attorney, Agent, or Firm* — Gerald E. Hespos; Michael J Porco

(57) ABSTRACT

Tension rollers are each supported by, at one end regarding the axial direction thereof, a first supporting member fastened to a first tensional force adjusting member by fastening members and, at the other end regarding the axial direction thereof, a second supporting member fastened to a second tensional force adjusting member by fastening members. The first and second supporting members each include elongate insertion holes as insertion holes in which the fastening members are inserted. The first and second tensional force adjusting members each include elongate insertion holes as insertion holes in which the fastening members are inserted. The elongate insertion holes each extend in a direction intersecting the axial direction of the tension roller.

5 Claims, 14 Drawing Sheets

(51) Int. Cl.

| | |
|---|---|
| ***B65H 5/06*** | (2006.01) |
| ***B65H 23/18*** | (2006.01) |
| ***B65H 23/188*** | (2006.01) |

(56) References Cited

U.S. PATENT DOCUMENTS

2019/0344595 A1* 11/2019 Akahane .............. B65H 23/188
2021/0023861 A1* 1/2021 Torii ........................ B41J 13/02

* cited by examiner

TRANSPORTING DEVICE AND IMAGE FORMING DEVICE

TECHNICAL FIELD

The present invention relates to a transporting device that transports a predetermined workpiece, and an image forming device including the transporting device.

BACKGROUND ART

In an image forming device that forms an image on a predetermined workpiece, for example, in an ink-jet printer, a liquid jetting head (image forming unit) that jets minute amounts of ink (liquid) onto an image forming target is used. As the workpiece is transported in a predetermined transport direction and the liquid jetting head jets ink while moving back and forth in a scan direction perpendicular to the transport direction, a character or an image is formed on the workpiece.

JP 2005-67105 A discloses the ink-jet printer described above. In this printer, the workpiece fed out from a feed roll is taken up by a take-up roll, whereby the workpiece is transported. While being transported, the workpiece is given tensional force by a plurality of tension rollers.

The tension rollers need be attached with their positions adjusted so as their axial directions to be parallel to the width direction of the workpiece. Attaching of the tension rollers is done by an operator. If the tension rollers are attached with their axial directions not parallel to the width direction of the workpiece, and then the workpiece is given the tensional force by the tension rollers while being transported, wrinkles may be created on the workpiece. Therefore, it is required for the tension roller, when being attached, to allow easy positional adjustment with regard to the direction intersecting the axial direction of the tension roller.

SUMMARY OF INVENTION

An object of the present invention is to provide a transporting device that allows, when tension rollers are attached, easy positional adjustment of the tension rollers with regard to the direction intersecting the axial direction of the tension rollers, and an image forming device including the transporting device.

A transporting device according to one aspect of the present invention includes a transport roller, a feeding unit, a take-up unit, and a tension mechanism. The transport roller transports a predetermined workpiece in a predetermined transport direction so as the workpiece to pass through an image forming position where image forming processing is performed on the workpiece. The feeding unit includes a first support shaft that extends in a width direction of the workpiece perpendicular to the transport direction and supports a first roll which is a rolled body of the workpiece to be subjected to the image forming processing. The feeding unit feeds out the workpiece from the first roll on the first support shaft to the transport roller. The take-up unit includes a second support shaft that extends in the width direction and supports a second roll which is a rolled body of the workpiece that has been subjected to the image forming processing. The take-up unit takes up the workpiece that has been fed out from the first roll and passed through the transport roller onto the second support shaft, the taken up workpiece forming a portion of the second roll. The tension mechanism gives tensional force to the workpiece between the first roll and the second roll.

The tension mechanism includes a tension roller, a pair of supporting members, and a pair of tensional force adjusting members. The tension roller extends in the width direction and contacts the workpiece to give the tensional force to the workpiece. A pair of supporting members each has a form of a plate vertical to the tension roller. A pair of supporting members includes a first supporting member that supports one end of the tension roller regarding the axial direction thereof, and a second supporting member that supports the other end of the tension roller. A pair of tensional force adjusting members includes a first tensional force adjusting member to which the first supporting member is fastened by fastening members at the one end, and a second tensional force adjusting member to which the second supporting member is fastened by fastening members at the other end. The tension roller is moved by pivoting the first and second tensional force adjusting members about each axis thereof extending in the width direction to adjust the tensional force given to the workpiece. The first supporting member and the first tensional force adjusting member are arranged in the axial direction of the tension roller, and the second supporting member, and the second tensional force adjusting member are arranged in the axial direction of the tension roller. Each of these members includes elongate insertion holes as insertion holes in which the fastening members are inserted, the insertion holes each extending in a direction intersecting the axial direction of the tension roller.

An image forming device according to another aspect of the present invention includes an image forming unit that performs image forming processing on a predetermined workpiece, and the transporting device described above that transports the workpiece so as to pass through an image forming position opposing the image forming unit.

DESCRIPTION OF EMBODIMENTS

[Overall Configuration of Image Forming Device]

Figure 1:
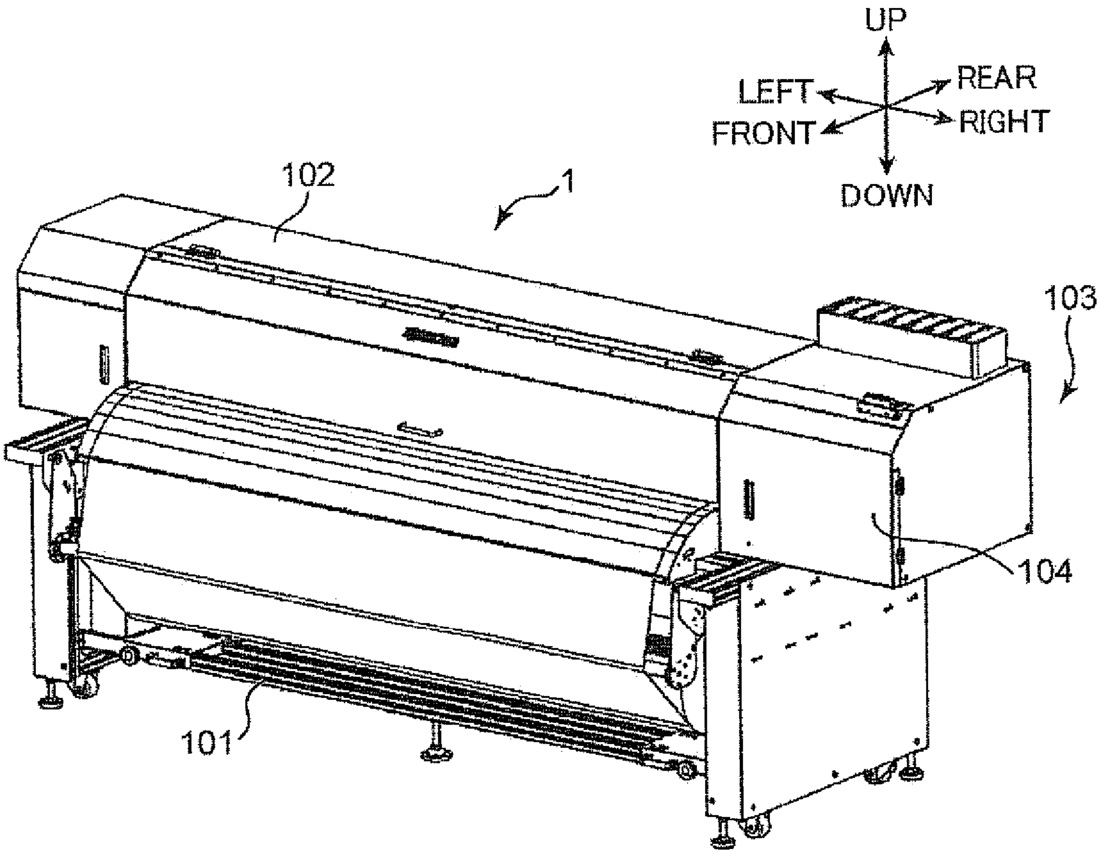
FIG. 1 is a perspective view illustrating external appearance of an image forming device according to one embodiment of the present invention.
Figure 2:
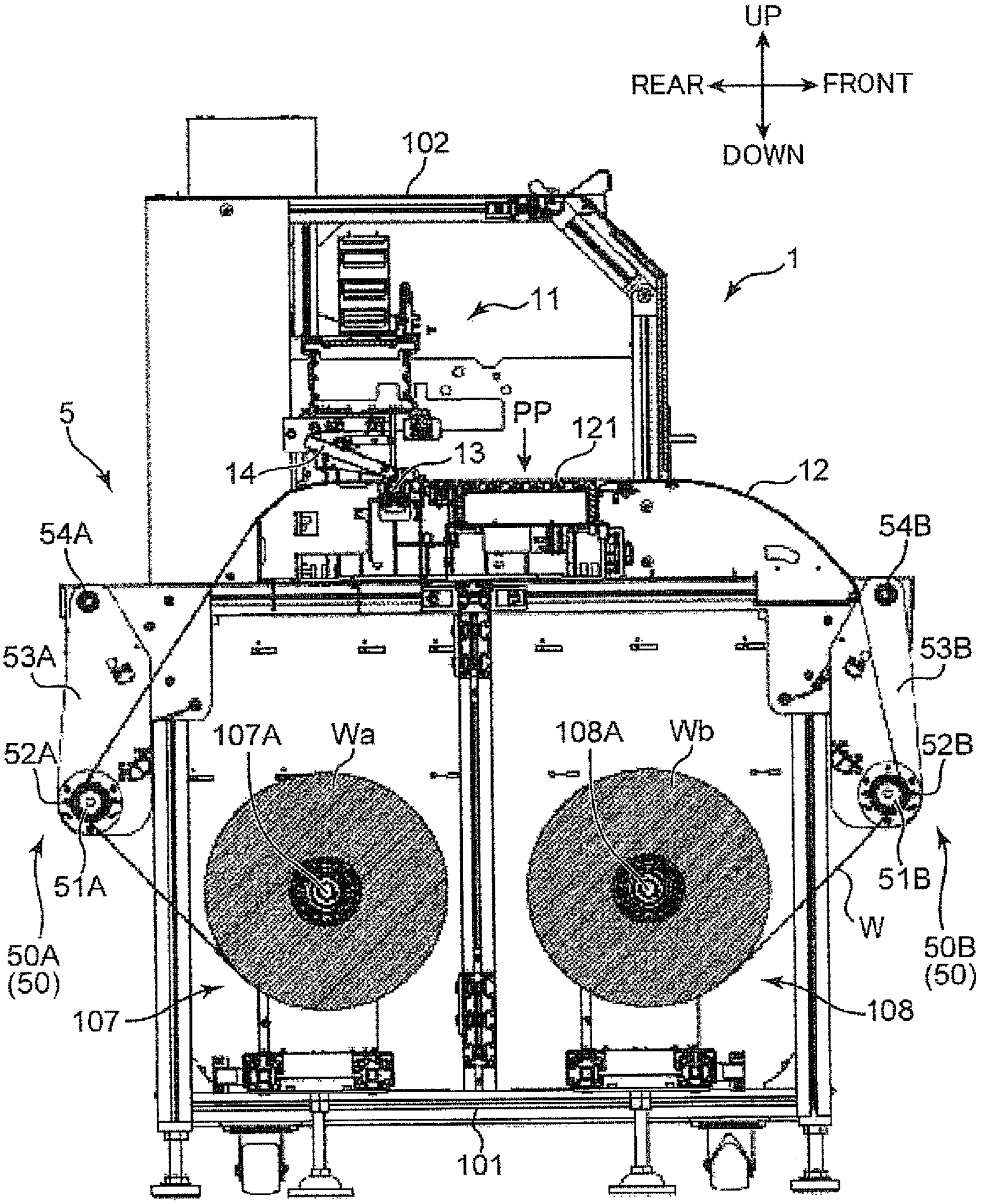
FIG. 2 is a cross-sectional view of the image forming device.
Figure 3:
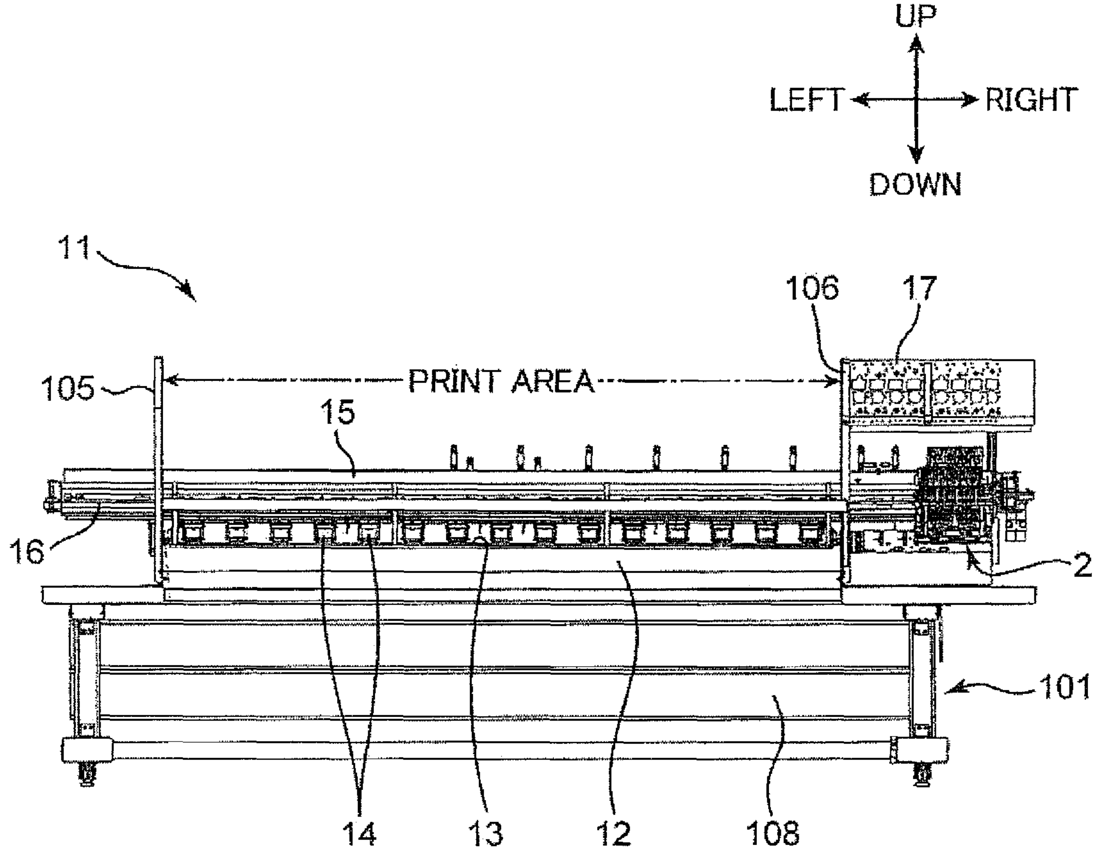
FIG. 3 is a front view of the image forming device with an outer cover removed.
Figure 4:
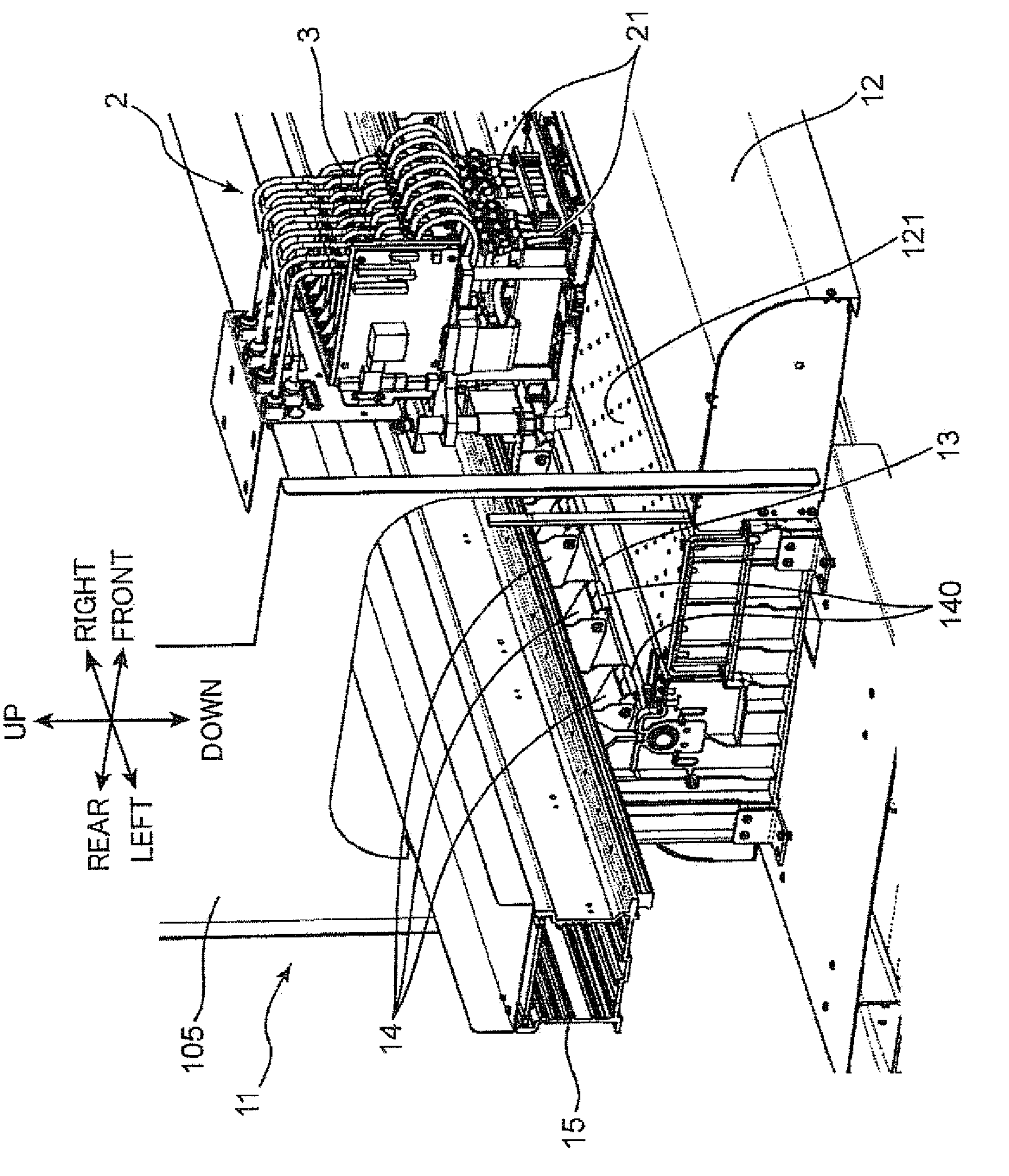
FIG. 4 is an enlarged perspective view illustrating a portion of the image forming device with the outer cover removed.

An image forming device according to an embodiment of the present invention will now be described with reference to the drawings. FIG. 1 is a perspective view illustrating external appearance of an image forming device 1 according to one embodiment of the present invention. FIG. 2 is a cross-sectional view of the image forming device 1. FIG. 3 is a front view of the image forming device 1 with an outer cover 102 removed. FIG. 4 is an enlarged perspective view illustrating a portion of the image forming device 1 with the outer cover 102 removed. In FIGS. 1 to 4 and the drawings mentioned thereafter, a front-and-rear direction, a right-and-left direction, and an up-and-down direction are shown. These directions are merely for convenience of description, not by means of limitation.

The image forming device 1 is an image forming device that performs image forming processing (print processing), such as printing letters and images, by the ink-jet method on workpieces W of different sizes and types, such as paper sheets, resin sheets, and fabric sheets. In particular, the image forming device is suitable for performing image forming processing on a large and long workpiece W. The image forming device 1 includes a base frame 101 with casters, and a device body 11 mounted on the base frame 101 and configured to perform the image forming processing.

The device body 11 includes a workpiece transport path 12, a transport roller 13, a transporting device 5 including a plurality of pinch roller units 14, and a carriage 2. The transporting device 5 is a device that transports the workpiece W in the forward direction (predetermined transport direction) so as the workpiece W to pass through an image forming position PP where the image forming processing is performed on the workpiece W. The workpiece transport path 12 is a transport path that extends in the front-and-rear direction. The workpiece W to be subjected to the image forming processing is transported along the transport path into the device body 11 from the rear side and out of the device body 11 from the front side.

The transport roller 13 is a roller extending in the right-and-left direction and disposed above the base frame 101 to generate drive force that intermittently feeds the workpiece W along the workpiece transport path 12. In other words, the transport roller 13 is rotated about a predetermined shaft center extending in the right-and-left direction, and thereby the workpiece W is transported in the forward direction to pass through the image forming position PP opposing a head unit 21 (image forming unit). The pinch roller unit 14 is disposed so as to oppose the transport roller 13 from above and includes a pinch roller 140 that forms, with the transport roller 13, a transport nip. A plurality of pinch roller units 14 is arranged in the right-and-left direction along the transport roller 13 at a predetermined interval.

The carriage 2 is a movable component on which a unit performing the image forming processing on the workpiece W is mounted. The carriage 2 moves back and forth on the base frame 101 in the right-and-left direction. Above the base frame 101, a carriage guide 15 including a guide rail that extends in the right-and-left direction and guides the carriage 2 to move back and forth is provided. A timing belt 16 is movably assembled to the carriage guide 15 so as to circulate in the right-and-left direction. The carriage 2 includes a fixing part by which the carriage 2 is fixed to the timing belt 16. Along with the normal or reverse circulative movement of the timing belt 16, the carriage 2, guided by the guide rail, moves in the right-and-left direction.

The image forming processing is performed in such a manner that the transport roller 13 and the pinch roller units 14 intermittently feeds the workpiece W, and while the workpiece W is not moving, the carriage 2 moves in the right-and-left direction to perform print scanning on the workpiece W. On the workpiece transport path 12, a platen 121 (FIGS. 2 and 4) having the function of suctioning the workpiece W is disposed under the moving path of the carriage 2. That is, the image forming position PP for the workpiece W is provided on the platen 121. In the image forming processing, the carriage 2 performs the print scanning while the workpiece W is suctioned onto the platen 121.

The outer cover 102 covers the device body 11. A side station 103 is disposed in the right side region of the outer cover 102. A stationary ink cartridge rack 17 that holds ink cartridges (not shown) storing ink for the image forming processing is housed in the side station 103.

In front of the side station 103, a carriage retreat area 104 which is a space where the carriage 2 retreats is provided. As illustrated in FIG. 3, a left frame 105 and a right frame 106 rise from the base frame 101 with a gap, in accordance with the workpiece transport path 12, therebetween in the right-and-left direction. The area between the left and right frames 105 and 106 serves as a print area in which the image forming processing is performed. The carriage guide 15 has a longer right-and-left width than the print area, so that the carriage 2 can move further beyond the right side of the print area. When the image forming processing is not performed, the carriage 2 retreats into the carriage retreat area 104.

As illustrated in FIG. 4, the head unit 21 (image forming unit) that performs the image forming processing on the workpiece W by jetting ink onto the workpiece W, and a liquid supply unit 3 that supplies ink from the ink cartridges to the head unit 21 are mounted on the carriage 2. FIG. 4 illustrates an example where two head units 21 and eight liquid supply units 3 are mounted on the carriage 2. That is, four liquid supply units 3 are provided per one head unit 21 to supply different types of ink, that is, cyan, magenta, yellow, and black. The carriage 2 moves back and forth in the right-and-left direction along the carriage guide 15. Note that, the mode may be configured to jet up to eight different colors of ink from the two head units 21 with the liquid supply units 3 filled with ink of different colors.

As illustrated in FIG. 2, the transporting device 5 further includes a feeding unit 107, a take-up unit 108, and a tension mechanism 50.

The feeding unit 107 is disposed in the rear portion of the base frame 101 and includes a first support shaft 107A that supports a first roll Wa, which is a rolled body of the workpiece W to be subjected to the image forming processing. The first support shaft 107A is a shaft extending in the width direction (right-and-left direction) of the workpiece W perpendicular to the transport direction of the workpiece W. The feeding unit 107 feeds out the workpiece W from the first roll Wa on the first support shaft 107A to the transport roller 13.

The take-up unit 108 is disposed in the front portion of the base frame 101 and includes a second support shaft 108A that supports a second roll Wb, which is a rolled body of the workpiece W that has been subjected to the image forming processing. The second support shaft 108A is a shaft extending in the width direction of the workpiece W. The take-up unit 108 includes a drive source (not shown) that rotatably drives the second support shaft 108A. The take-up unit 108 takes up the workpiece W that has been fed out from the first roll Wa and passed through the transport roller 13 onto the second support shaft 108A, the taken up workpiece W forming a portion of the second roll.

The tension mechanism 50 is a mechanism that gives tensional force (tension) to the workpiece W between the first roll Wa and the second roll Wb. In the embodiment, the tension mechanism 50 includes a first tension mechanism 50A and a second tension mechanism 50B. The first tension mechanism 50A gives the tensional force to the workpiece W that has been fed out from the first roll Wa but not yet passed the transport roller 13. The second tension mechanism 50B gives the tensional force to the workpiece W that has passed the transport roller 13 to be taken up by the second roll Wb.

[Detail Configuration of Tension Mechanism]

Figure 5:
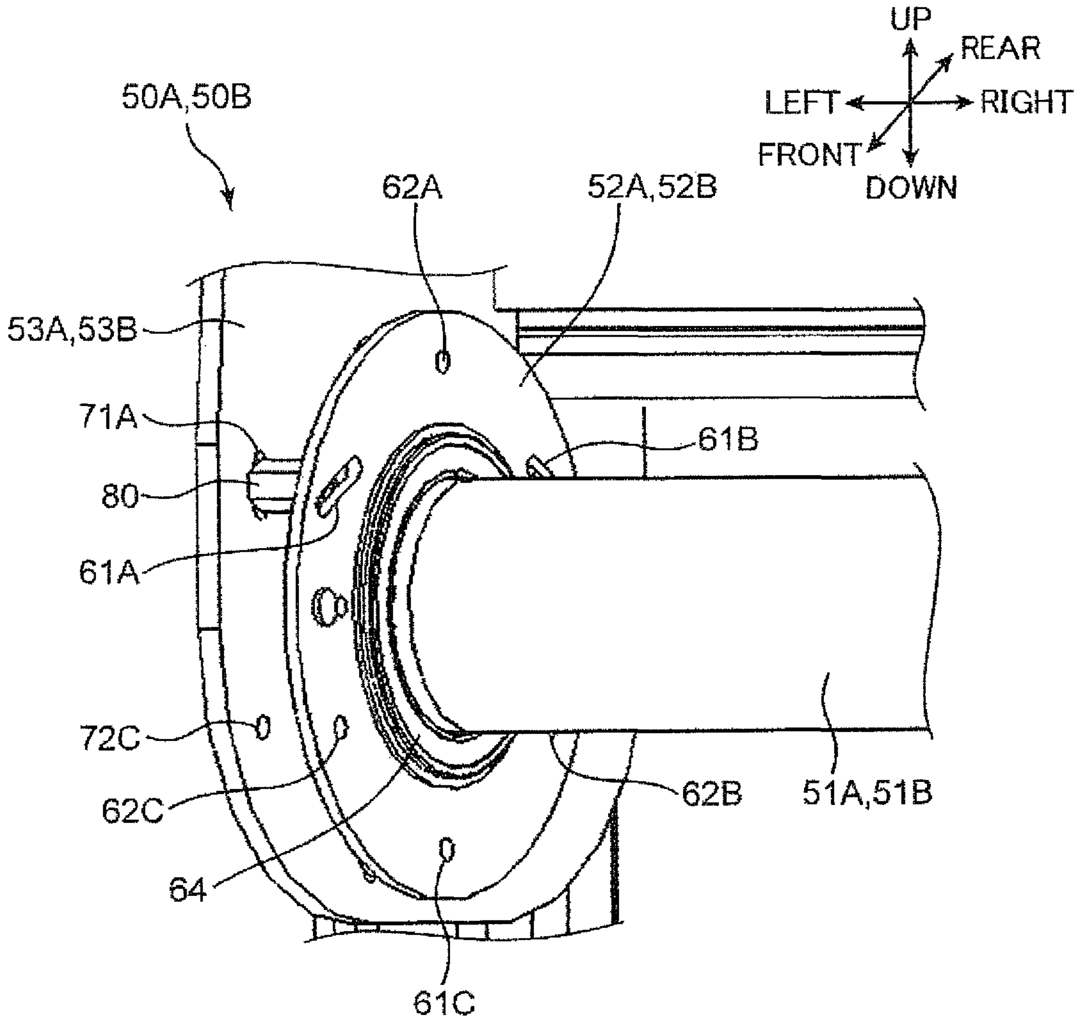
FIG. 5 is an enlarged perspective view illustrating a portion around a tension mechanism included in the image forming device.
Figure 6:
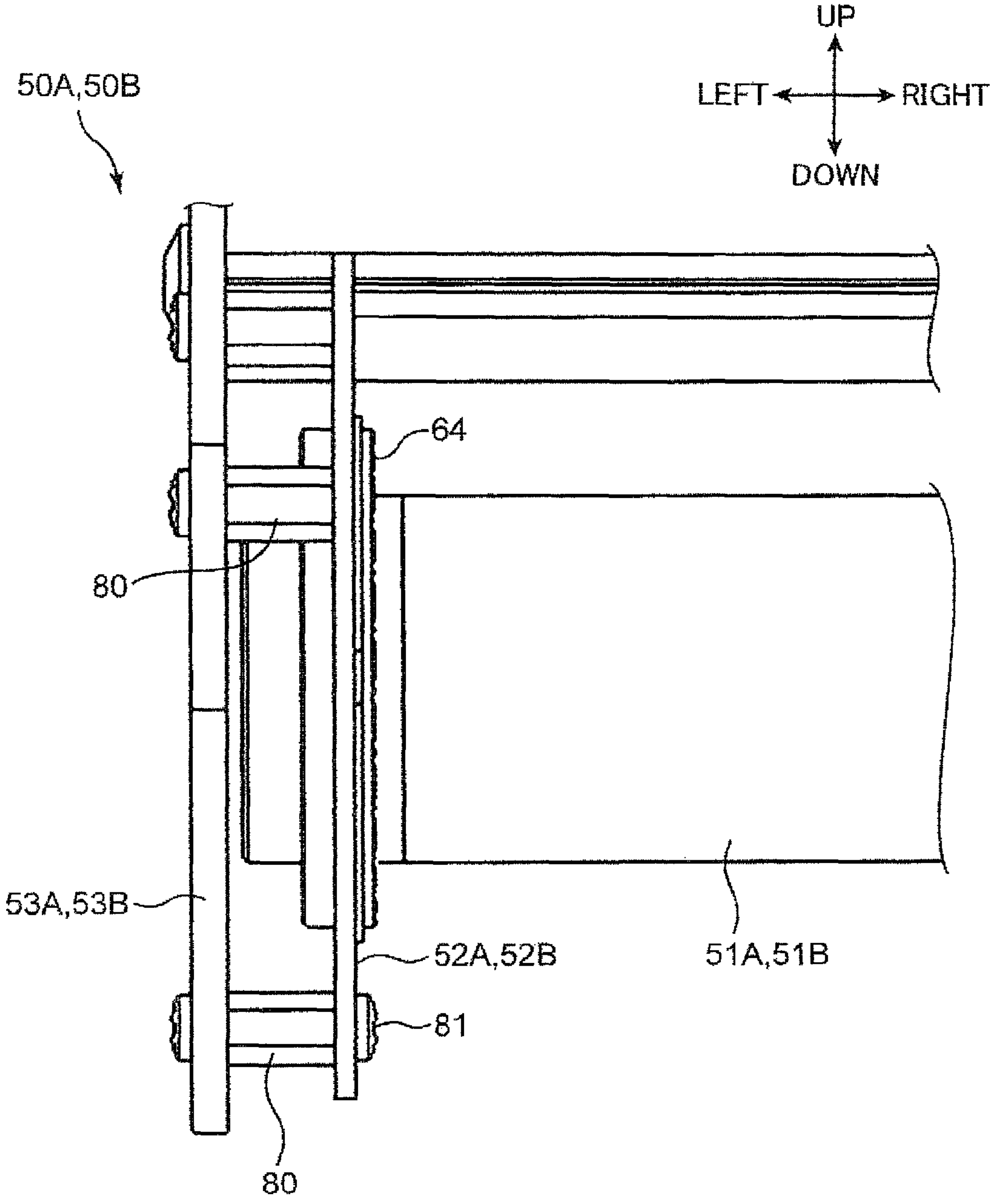
FIG. 6 is an enlarged front view illustrating a portion around the tension mechanism.
Figure 7:
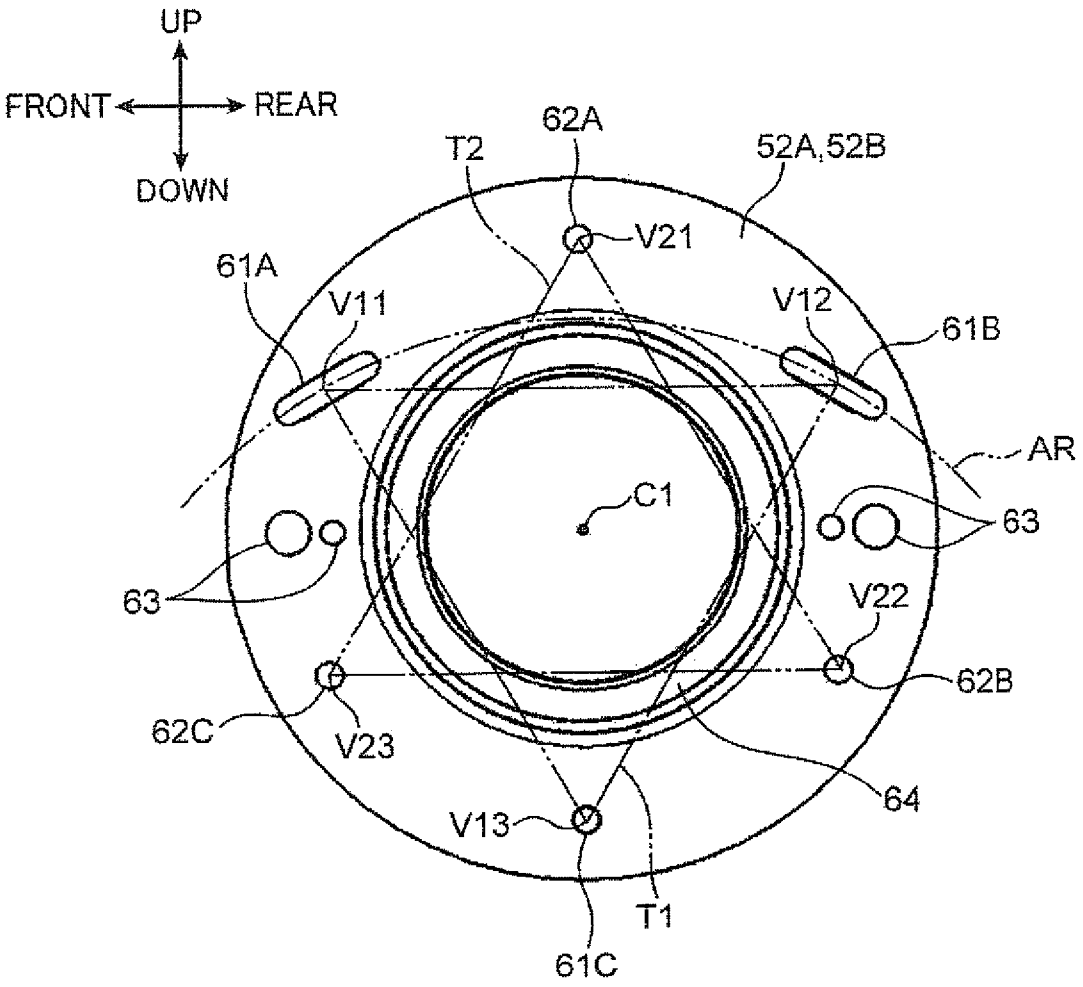
FIG. 7 is a view of a pair of supporting members included in the tension mechanism, when viewed from one side in the axial direction of a tension roller.
Figure 8:
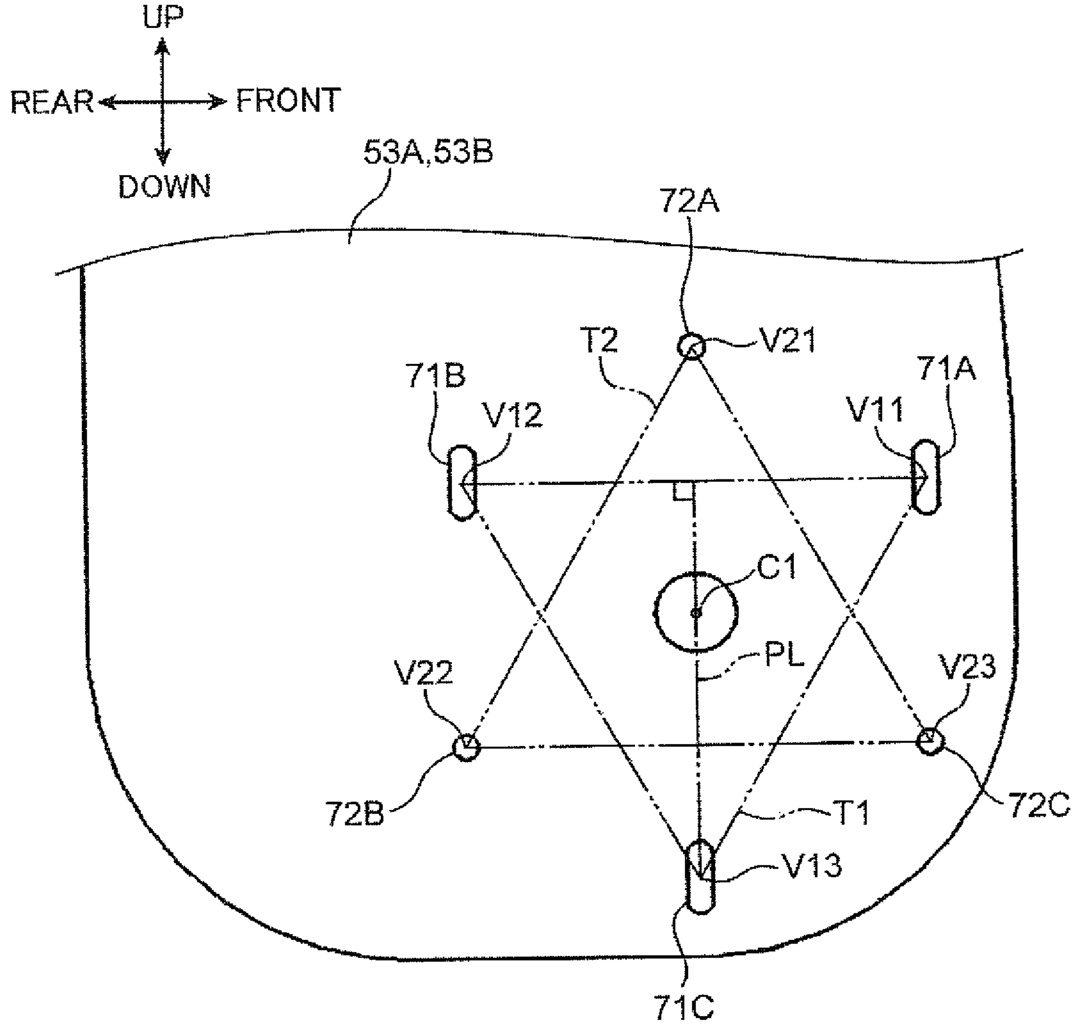
FIG. 8 is a view of a pair of tensional force adjusting members included in the tension mechanism, when viewed from the other side in the axial direction of the tension roller.

The configuration of the first tension mechanism 50A and the second tension mechanism 50B will be described in detail with reference to FIGS. 5 to 8 in addition to FIG. 2. FIG. 5 is an enlarged perspective view of a portion around the first and second tension mechanisms 50A and 50B. FIG. 6 is a front view of the portion. FIG. 7 is a view of pairs of supporting members 52A and 52B respectively provided in the first and second tension mechanisms 50A and 50B, when viewed from one side (right side) in the axial direction of tension rollers 51A and 51B. FIG. 8 is a view of pairs of tensional force adjusting members 53A and 53B respectively provided in the first and second tension mechanisms 50A and 50B, when viewed from the other side (left side) in the axial direction of the tension rollers 51A and 51B.

The first tension mechanism 50A includes the tension roller 51A, the pair of supporting members 52A, and the pair of tensional force adjusting members 53A. The tension roller 51A is a roller extending in the width direction (right-and-left direction) of the workpiece W. The tension roller MA contacts the workpiece W, from the inner side thereof, that has been fed out from the first roll Wa but not yet passed through the transport roller 13, and thereby gives the tensional force to the workpiece W.

The pair of supporting members 52A each has a form of a plate vertical to the tension roller MA and includes a first supporting member that supports one end of the tension roller 51A regarding the axial direction, and a second supporting member that supports the other end of the tension roller MA. In FIGS. 2, 5, and 6, the one end of the tension roller MA is illustrated, and among the pair of supporting members 52A, only the first supporting member, appended with reference sign "52A", is illustrated, while the second supporting member disposed at the other end is omitted in the drawing. As illustrated in FIGS. 5, 6, and 7, the pair of supporting members (first and second supporting members) 52A each has a form of a circular plate provided with a bearing 64 in the radially central portion thereof Δn end portion of the tension roller 51A, regarding the axial direction, is inserted in the bearing 64. Hereinafter, the pair of supporting members 52A means each of the first and second supporting members.

The pair of tensional force adjusting members 53A includes a first tensional force adjusting member disposed at one end of the tension roller 51A regarding the axial direction, and a second tensional force adjusting member disposed at the other end. The first and second tensional force adjusting members are each an arm member pivotally fastened to the rear end portion of the base frame 101 so as to pivot about a pivot shaft 54A extending in the width direction (right-and-left direction) of the workpiece W. In FIGS. 2, 5, and 6, among the pair of tensional force adjusting members 53A, only the first tensional force adjusting member, appended with reference sign "53A", is illustrated while the second tensional force adjusting member disposed at the other end is omitted in the drawing. The first tensional force adjusting member of the pair of tensional force adjusting members 53A is fastened to the first supporting member of the pair of supporting members 52A at the one end by fastening members 81 via threaded hole members 80 (FIGS. 5 and 6). The second tensional force adjusting member is fastened to the second supporting member at the other end by fastening members 81 via the threaded hole members 80. The tension roller 51A is moved by pivoting the first and second tensional force adjusting members about the pivot shaft 54A, and thereby the tensional force acting on the workpiece W is adjusted. The fastening member 81 is a threaded member such as screw. Hereinafter, the pair of tensional force adjusting members 53A means each of the first and second tensional force adjusting members.

The second tension mechanism 50B, like the first tension mechanism 50A, includes a tension roller 51B, the pair of supporting members 52B, and the pair of tensional force adjusting members 53B. The tension roller 51B is a roller extending in the width direction of the workpiece W. The tension roller 51B contacts the workpiece W, from the inner side thereof, that has passed through the transport roller 13 and is to be taken up by the second roll Wb, and thereby gives the tensional force to the workpiece W. Since the pair of supporting members 52A and the pair of supporting members 52B have the same structure and the pair of tensional force adjusting members 53A and the pair of tensional force adjusting members 53B have the same structure, reference signs "52A, 52B" and "53A, 53B" are used in FIGS. 2, 5, and 6.

The pair of supporting members 52B each has a form of a plate vertical to the tension roller 51B and includes a first supporting member that supports one end of the tension roller 51B regarding the axial direction, and a second supporting member that supports the other end of the tension roller 51B. In FIGS. 2, 5, and 6, among the pair of supporting members 52B, only the first supporting member, appended with reference sign "52B", is illustrated. Hereinafter, the pair of supporting members 52B means each of the first and second supporting members. The pair of supporting members 52B, like the pair of supporting members 52A, each has a form of a circular plate provided with a bearing 64 in the radially central portion thereof Δn end portion of the tension roller 51B, regarding the axial direction, is inserted in the bearing 64.

The pair of tensional force adjusting members 53B includes a first tensional force adjusting member disposed at one end of the tension roller 51B regarding the axial direction, and a second tensional force adjusting member disposed at the other end. The first and second tensional force adjusting members are each an arm member pivotally fastened to the front end portion of the base frame 101 so as to pivot about a pivot shaft 54B extending in the width direction of the workpiece W. In FIGS. 2, 5, and 6, among the pair of tensional force adjusting members 53B, only the first tensional force adjusting member, appended with reference sign "53B" is illustrated. The first tensional force adjusting member of the pair of tensional force adjusting members 53B is fastened to the first supporting member of the pair of supporting members 52B by the fastening members 81. The second tensional force adjusting member is fastened to the second supporting member at the other end by the fastening members 81. The tension roller 51B is moved by pivoting the first and second tensional force adjusting members about the pivot shaft 54B, and thereby the tensional force acting on the workpiece W is adjusted. Hereinafter, the pair of tensional force adjusting members 53B means each of the first and second tensional force adjusting members.

As illustrated in FIG. 7, the pair of supporting members 52A of the first tension mechanism 50A and the pair of supporting members 52B of the second tension mechanism 50B include elongate insertion holes 61A and 61B as insertion holes in which the fastening members 81 are inserted, the insertion holes 61A and 61B each extending in a direction intersecting the axial direction of the tension rollers 51A and 51B. As illustrated in FIG. 8, the pair of tensional force adjusting members 53A of the first tension mechanism 50A and the pair of tensional force adjusting members 53B of the second tension mechanism 50B include elongate insertion holes 71A, 71B, and 71C as insertion holes in which the fastening members 81 are inserted, the insertion holes 71A, 71B, and 71C each extending in a direction intersecting the axial direction of the tension rollers 51A and 51B.

In the first tension mechanism 50A and the second tension mechanism 50B configured as described above, the tension rollers 51A and 51B that give the tensional force to the workpiece W are supported, by both end portions thereof regarding the axial direction, respectively by the pair of supporting members 52A and the pair of supporting members 52B. The pair of supporting members 52A is fastened to the pair of tensional force adjusting members 53A by the fastening members 81, and the pair of supporting members 52B is fastened to the pair of tensional force adjusting members 53B by the fastening members 81. The pair of supporting members 52A and the pair of tensional force adjusting members 53A are arranged in the axial direction of the tension roller 51A. The pair of supporting members 52B and the pair of tensional force adjusting members 53B are arranged in the axial direction of the tension roller 51B. That is, at one end regarding the axial direction, the first supporting member and the first tensional force adjusting member are disposed next to each other, while at the other end regarding the axial direction, the second supporting member and the second tensional force adjusting member are disposed next to each other. The pairs of supporting members 52A and 52B include elongate insertion holes 61A and 61B as insertion holes in which the fastening members 81 are inserted, the insertion holes 61A and 61B each extending in a direction intersecting the axial direction of the tension rollers 51A and 51B. Furthermore, the pairs of tensional force adjusting members 53A and 53B include elongate insertion holes 71A, 71B, and 71C as insertion holes in which the fastening members 81 are inserted, the insertion holes 71A, 71B, and 71C each extending in a direction intersecting the axial direction of the tension rollers 51A and 51B.

Thus, when the tension rollers 51A and 51B are attached to the respective pairs of tensional force adjusting members 53A and 53B via the respective pairs of supporting members 52A and 52B, displacement of the tension rollers 51A and 51B is allowed in directions intersecting the axial direction, the allowed directions being along the elongate insertion holes 61A and 61B and insertion holes 71A, 71B, and 71C in which the fastening members 81 are inserted. This allows, when the tension rollers 51A and MB are attached, easy positional adjustment with regard to the directions intersecting the axial direction of the tension rollers MA and MB. As a result, the positional adjustment of the tension rollers MA and MB to make the axial direction of the tension rollers MA and MB be parallel to the width direction of the workpiece W can be made. Accordingly, creation of wrinkles on the workpiece W which is transported while given the tensional force by the tension rollers MA and MB can surely be prevented.

In the embodiment, the pair of supporting members 52A of the first tension mechanism 50A and the pair of supporting members 52B of the second tension mechanism 50B are identical in shape and size and have the insertion holes, in which the fastening members 81 are inserted, at the same respective locations. The pair of supporting members 52A and the pair of supporting members 52B are therefore interchangeable. Similarly, the pair of tensional force adjusting members 53A of the first tension mechanism 50A and the pair of tensional force adjusting member 53B of the second tension mechanism 50B are identical in shape and size and have the insertion holes, in which the fastening members 81 are inserted, at the same respective locations. The pair of tensional force adjusting members 53A and the pair of tensional force adjusting members 53B are therefore interchangeable.

As described above, among the first tension mechanism 50A and the second tension mechanism 50B, the pair of supporting members 52A of the first tension mechanism 50A and the pair of supporting members 52B of the second tension mechanism 50B are interchangeable as well as the pair of tensional force adjusting members 53A of the first tension mechanism 50A and the pair of tensional force adjusting members 53B of the second tension mechanism 50B are therefore interchangeable. Therefore, when the tension rollers MA and MB are attached to the respective pairs of tensional force adjusting members 53A and 53B via the respective pairs of supporting members 52A and 52B, the positional adjustment of the tension rollers 51A and 51B can be made by the same operation for both the first tension mechanism 50A and second tension mechanism 50B. This provides good operability of the positional adjustment of the tension rollers 51A and 51B respectively made for the first tension mechanism 50A and the second tension mechanism 50B.

Furthermore, it is preferable in the first tension mechanism 50A that the elongate insertion holes 61A and 61B formed in the pair of supporting members 52A extend in the directions intersecting the directions in which the elongate insertion holes 71A, 71B, and 71C formed in the pair of tensional force adjusting members 53A extend. Similarly, it is preferable in the second tension mechanism 50B that the elongate insertion holes 61A and 61B formed in the pair of supporting members 52B extend in the directions intersecting the directions in which the elongate insertion holes 71A, 71B, and 71C formed in the pair of tensional force adjusting members 53B extend. In the example illustrated in FIGS. 7 and 8, the elongate insertion holes 61A and 61B formed in the pair of supporting members 52A and 52B extend approximately in the transport direction of the workpiece W perpendicular to the axial direction of the tension rollers 51A and 51B. Meanwhile, the elongate insertion holes 71A, 71B, and 71C formed in the pairs of tensional force adjusting members 53A and 53B extend in the up-and-down direction perpendicular to the axial direction of the tension rollers 51A and 51B and the transport direction of the workpiece W.

In this configuration, when the tension rollers 51A and 51B are attached to the respective pairs of tensional force adjusting members 53A and 53B via the respective pairs of supporting members 52A and 52B, the displacement of the tension rollers 51A and 51B is allowed along the elongate insertion holes 61A and 61B of the pairs of supporting members 52A and 52B and also along the elongate insertion holes 71A, 71B, and 71C of the pairs of tensional force adjusting members 53A and 53B. That is, when the tension rollers 51A and 51B are attached to the respective pairs of tensional force adjusting members 53A and 53B, the displacement of the tension rollers 51A and 51B is allowed in the two intersecting directions. Accordingly, the positional adjustment of the tension rollers 51A and 51B to make the axial direction of the tension rollers 51A and 51B be parallel to the width direction of the workpiece W can be made more easily.

<Detail of Insertion Holes Formed in Supporting Member and Tensional Force Adjusting Member>

With reference to FIGS. 7 and 8, the insertion holes, to which the fastening members 81 are inserted, formed in each of the pairs of supporting members 52A and 52B and the pairs of tensional force adjusting members 53A and 53B will be described in detail. In the embodiment, each member of the pairs of supporting members 52A and 52B is fastened to the corresponding member among the pairs of tensional force adjusting members 53A and 53B by the fastening members 81 at three locations. To describe in detail, the first supporting member is fastened to the first tensional force adjusting member at the one end of the tension roller 51A or 51B by the fastening members 81 at three locations, while the second supporting member is fastened to the second tensional force adjusting member at the other end of the tension roller 51A or 51B by the fastening members 81 at three locations.

Each member of the pairs of supporting members 52A and 52B includes three first insertion holes 61A, 61B, and 61C as insertion holes in which the fastening members 81 are inserted. The first insertion holes 61A, 61B, and 61C are respectively situated at a first vertex V11, a second vertex V12, and a third vertex V13 of a first virtual equilateral triangle T1 which is a virtual equilateral triangle of which gravity center C1 is on the shaft center of the corresponding tension roller 51A or 51B. Among the three first insertion holes 61A, 61B, and 61C, the first insertion hole 61A situated at the first vertex V11 and the first insertion hole 61B situated at the second vertex V12 are elongate holes extending along an arc AR having its center on the third vertex V13. The first insertion hole 61C situated at the third vertex V13 is a round hole having a diameter approximately the same as the outer diameter of the body of the fastening member 81. The arc AR has its center on the third vertex V13 and a radius identical to the length of the edge of the first virtual equilateral triangle T1.

When the tension rollers 51A and 51B are attached to the respective pairs of tensional force adjusting members 53A and 53B via the respective pairs of supporting members 52A and 52B, the pairs of tensional force adjusting members 53A and 53B are disposed so as the edge of the first virtual equilateral triangle T1 connecting the first vertex V11 and the second vertex V12 to be parallel to the front-and-rear direction, which is along the transport direction of the workpiece W. Thus, when the tension rollers 51A and 51B are attached, the first insertion hole 61A situated at the first vertex V11 and the first insertion hole 61B situated at the second vertex V12 extend approximately in the front-and-rear direction parallel to the transport direction of the workpiece W.

Each member of the pairs of tensional force adjusting members 53A and 53B includes three second insertion holes 71A, 71B, and 71C as insertion holes in which the fastening members 81 are inserted. The second insertion holes 71A, 72B, and 71C are respectively situated at the first vertex V11, the second vertex V12, and the third vertex V13 of the first virtual equilateral triangle T1. The three second insertion holes 71A, 71B, and 71C are each an elongate hole extending along a perpendicular line PL dropped from the third vertex V13 to the edge connecting the first vertex V11 and the second vertex V12.

When the tension rollers 51A and 51B are attached to the respective pairs of tensional force adjusting members 53A and 53B via the respective pairs of supporting members 52A and 52B, as described above, the pairs of tensional force adjusting members 53A and 53B are disposed so as the edge of the first virtual equilateral triangle T1 connecting the first vertex V11 and the second vertex V12 to be parallel to the front-and-rear direction, which is along the transport direction of the workpiece W. Thus, when the tension rollers 51A and 51B are attached, the three second insertion holes 71A, 71B, and 71C of each member of the pairs of tensional force adjusting members 53A and 53B extend in the up-and-down direction perpendicular to the axial direction of the tension rollers 51A and 51B and the transport direction of the workpiece W.

In this mode, the insertion holes, in which the fastening members 81 are inserted, of the pairs of supporting members 52A and 52B are provided as the first insertion holes 61A, 61B, and 61C respectively situated at the vertices V11, V12, and V13 of the first virtual equilateral triangle T1. Similarly, the insertion holes, in which the fastening members 81 are inserted, of the pairs of tensional force adjusting members 53A and 53B are provided as the second insertion holes 71A, 71B, and 71C respectively situated at the vertices V11, V12, and V13 of the first virtual equilateral triangle T1. Accordingly, the state of the tension rollers 51A and 51B attached to the respective pairs of tensional force adjusting members 53A and 53B via the respective pairs of supporting members 52A and 52B will be a stable one.

Meanwhile, when the tension rollers 51A and 51B are attached, the displacement of the tension rollers 51A and 51B along the arc AR having its center on the round first insertion hole 61C situated at the third vertex V13 (in the front-and-rear direction) is allowed, the arc AR being along the elongate first insertion holes 61A and 61B respectively situated at the first vertex V11 and the second vertex V12 of the first virtual equilateral triangle T1 on the pairs of supporting members 52A and 52B. Furthermore, the displacement of the tension rollers 51A and 51B along the perpendicular line PL dropped from the third vertex V13 to the edge connecting the first vertex V11 and the second vertex V12 (in the up-and-down direction) is allowed, the perpendicular line PL being along the elongate second insertion holes 71A, 71B, and 71C respectively situated at the vertices V11, V12, and V13 of the first virtual equilateral triangle T1 on the pairs of tensional force adjusting members 53A and 53B. Accordingly, the positional adjustment of the tension rollers 51A and 51B to make the axial direction of the tension rollers 51A and 51B be parallel to the width direction of the workpiece W can be made easily.

Furthermore, as illustrated in FIG. 7, each member of the pairs of supporting members 52A and 52B further includes three round third insertion holes 62A, 62B, and 62C as insertion holes in which the fastening members 81 are inserted. The third insertion holes 62A, 62B, and 62C are respectively situated at vertices V21, V22, and V23 of a second virtual equilateral triangle T2 which is given by rotating the first virtual equilateral triangle T1 60 degrees about the gravity center C1. As illustrated in FIG. 8, each member of the pairs of tensional force adjusting members 53A and 53B further includes three round fourth insertion holes 72A, 72B, and 72C as insertion holes in which the fastening members 81 are inserted. The fourth insertion holes 72A, 72B, and 72C are respectively situated at the vertices V21, V22, and V23 of the second virtual equilateral triangle T2.

In this configuration, for each member of the pairs of supporting members 52A and 52B, any three insertion holes among the first insertion holes 61A, 61B, and 61C respectively situated at the vertices V11, V12, and V13 of the first virtual equilateral triangle T1 and the third insertion holes 62A, 62B, and 62C respectively situated at the vertices of the second virtual equilateral triangle T2 may be used as the insertion holes in which the fastening members 81 are inserted. Similarly, for each member of the pairs of tensional force adjusting members 53A and 53B, any three insertion holes among the second insertion holes 71A, 71B, and 71C respectively situated at the vertices V11, V12, and V13 of the first virtual equilateral triangle T1 and the fourth insertion holes 72A, 72B, and 72C respectively situated at the vertices of the second virtual equilateral triangle T2 may be used as the insertion holes in which the fastening members 81 are inserted. Each member of the pairs of supporting members 52A and 52B can be fastened to the corresponding member among the pairs of tensional force adjusting members 53A and 53B by the fastening members 81 at three locations, taking either one of a first posture and a second posture which is made by rotating the member taking the first posture 180 degrees about the shaft center of the tension rollers 51A or 51B.

Regarding the configuration including the pairs of supporting members 52A and 52B and the pairs of tensional force adjusting members 53A and 53B described above, the positional adjustment of the tension rollers 51A and 51B when being attached will be described below.

(First Example of Positional Adjustment of Tension Roller)

Figure 9:
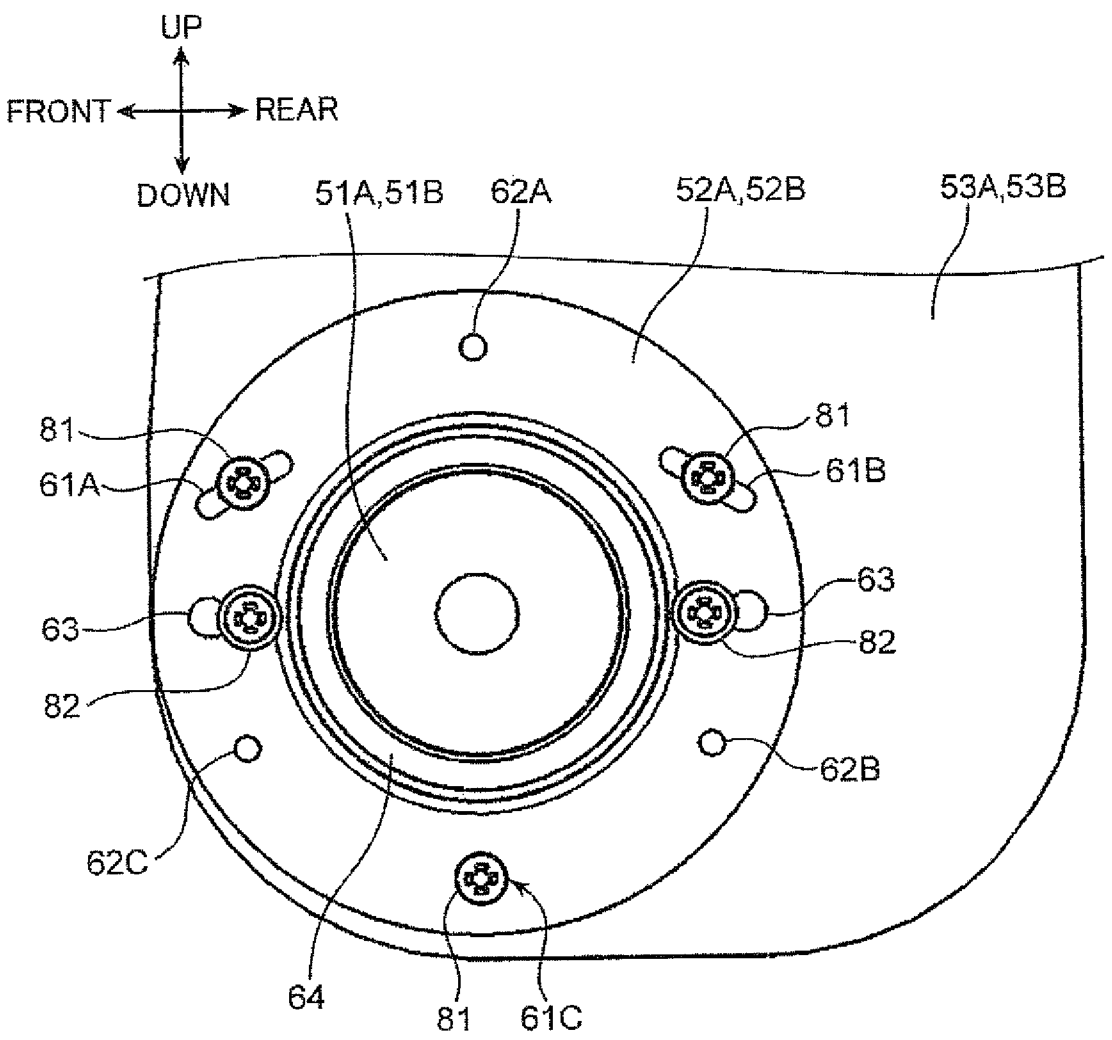
FIG. 9 is a view, when viewed from one side in the axial direction of the tension roller, illustrating a first example of positional adjustment made when the tension roller is attached to a pair of tensional force adjusting members via a pair of supporting members.
Figure 10:
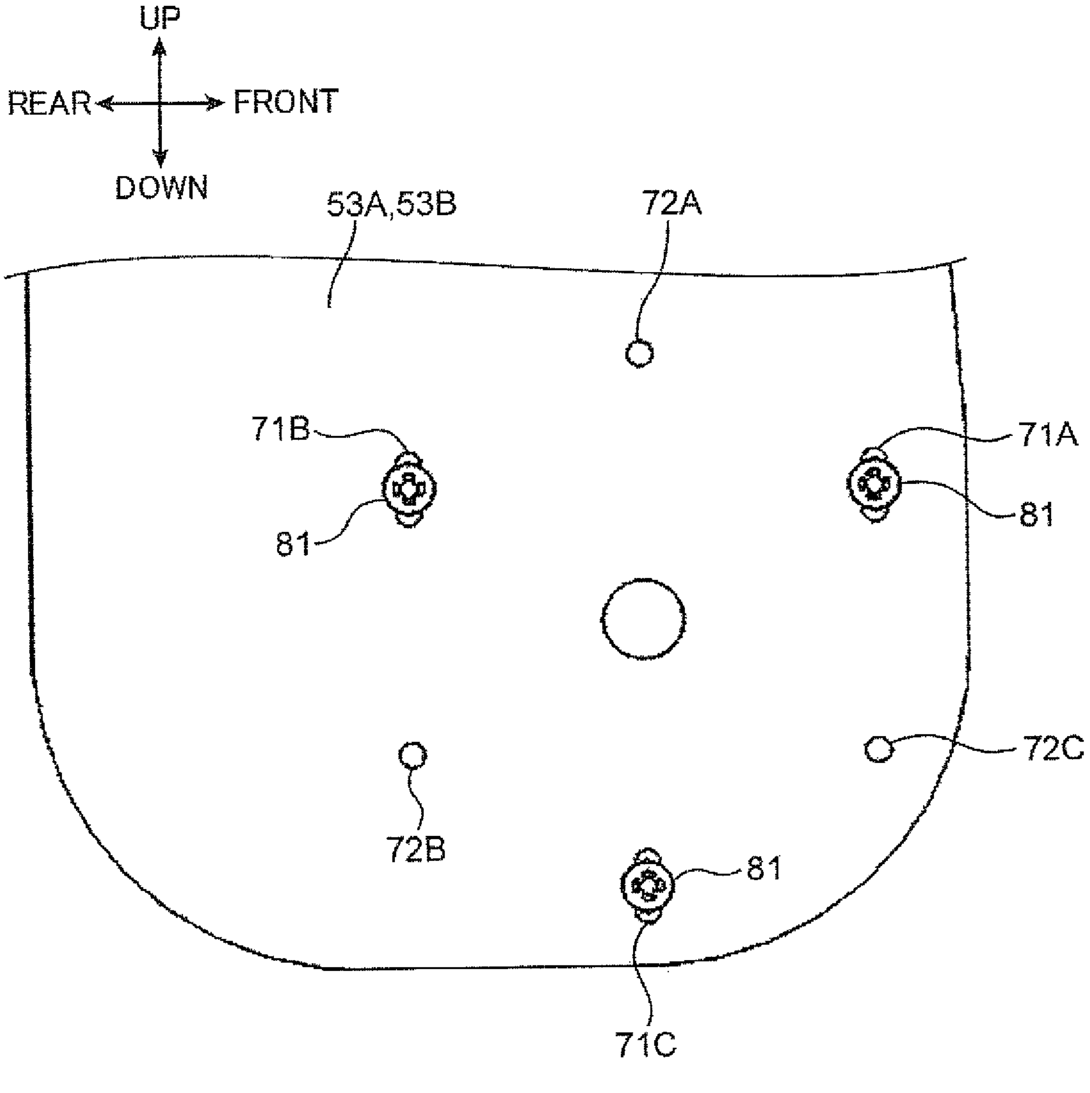
FIG. 10 is a view illustrating the first example when viewed from the other side in the axial direction of the tension roller.

FIGS. 9 and 10 illustrate a first example of the positional adjustment made when the tension rollers 51A and 51B are attached to the respective pairs of tensional force adjusting members 53A and 53B via the respective pairs of supporting members 52A and 52B. FIG. 9 is a view of the tension rollers 51A and 51B when viewed from one side (right side) in the axial direction, and FIG. 10 is a view of the tension rollers 51A and 51B when viewed from the other side (left side) in the axial direction.

As illustrated in FIGS. 9 and 10, when the pairs of supporting members 52A and 52B take the first posture, the fastening members 81 are inserted in the first insertion holes 61A, 61B, and 61C of the pairs of supporting members 52A and 52B and the second insertion holes 71A, 71B, and 71C of the pairs of tensional force adjusting members 53A and 53B. In this state, the displacement of the tension rollers 51A and 51B along the arc AR (FIG. 7) having its center on the round first insertion hole 61C situated at the third vertex V13 (in the front-and-rear direction) is allowed, the arc AR being along the elongate first insertion holes 61A and 61B respectively situated at the first vertex V11 and the second vertex V12 of the first virtual equilateral triangle T1 on the pairs of supporting members 52A and 52B. Furthermore, the displacement of the tension rollers 51A and 51B along the perpendicular line PL (FIG. 8) dropped from the third vertex V13 to the edge connecting the first vertex V11 and the second vertex V12 (in the up-and-down direction) is allowed, the perpendicular line PL extending along the elongate second insertion holes 71A, 71B, and 71C respectively situated at the vertices V11, V12, and V13 of the first virtual equilateral triangle T1 on the pairs of the tensional force adjusting members 53A and 53B. Accordingly, the positional adjustment of the tension rollers 51A and 51B to make the axial direction of the tension rollers 51A and 51B be parallel to the width direction of the workpiece W can be made easily.

As illustrated in FIGS. 7 and 9, each member of the pairs of supporting members 52A and 52B includes insertion holes 63 in which screws 82 are inserted to prevent detachment of the bearing 64 from the member of the pairs of supporting members 52A and 52B.

When the pairs of supporting members 52A and 52B take the second posture, the fastening members 81 are inserted in the third insertion holes 62A, 62B, and 62C of the pairs of supporting members 52A and 52B and the second insertion holes 71A, 71B, and 71C of the pairs of tensional force adjusting members 53A and 53B. Alternatively, when the pairs of supporting members 52A and 52B take the second posture, the fastening members 81 are inserted in the first insertion holes 61A, 61B, and 61C of the pairs of supporting members 52A and 52B and the fourth insertion holes 72A, 72B, and 72C of the pairs of tensional force adjusting members 53A and 53B.

(Second Example of Positional Adjustment of Tension Roller)

Figure 11:
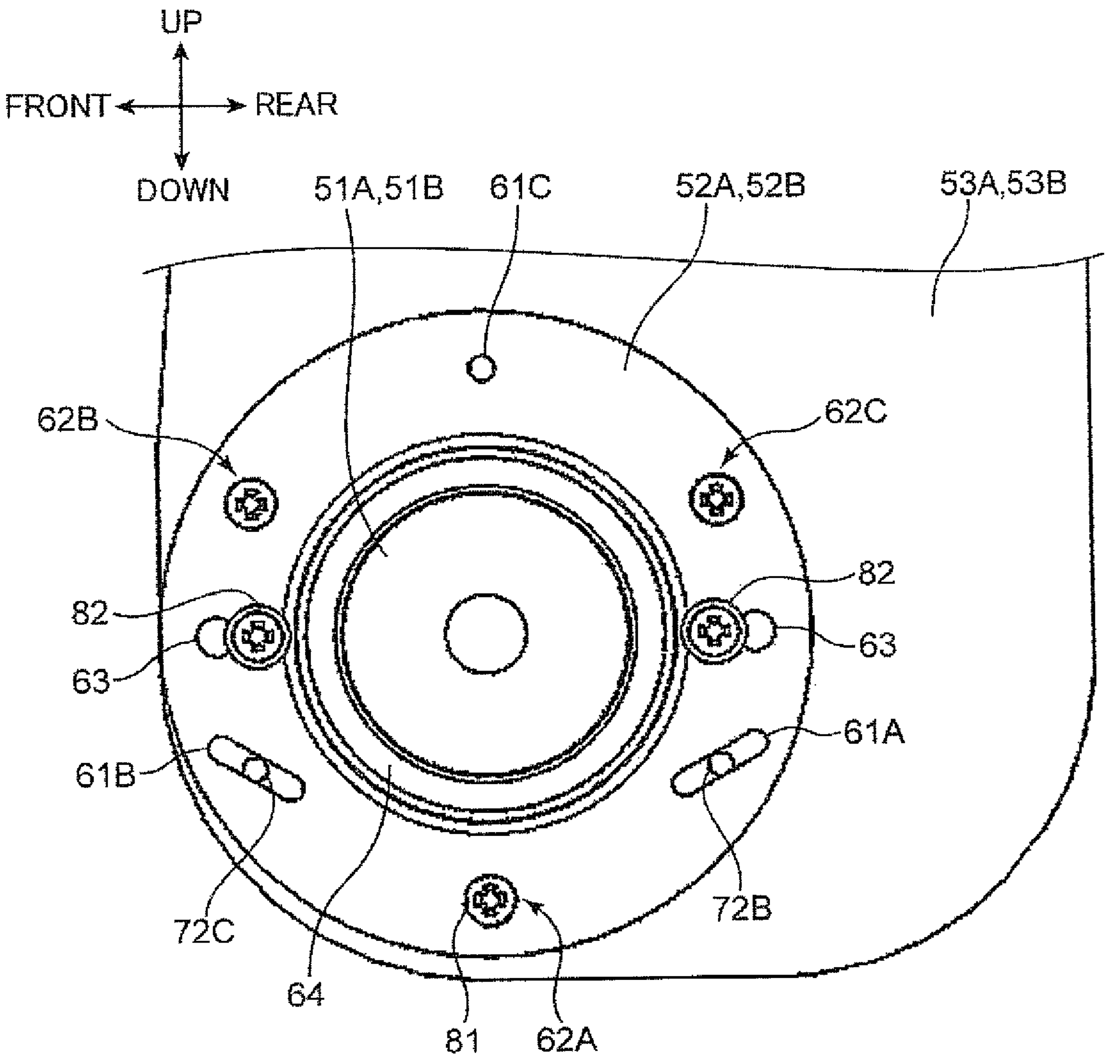
FIG. 11 is a view, when viewed from one side in the axial direction of the tension roller, illustrating a second example of positional adjustment made when the tension roller is attached to a pair of tensional force adjusting members via a pair of supporting members.
Figure 12:
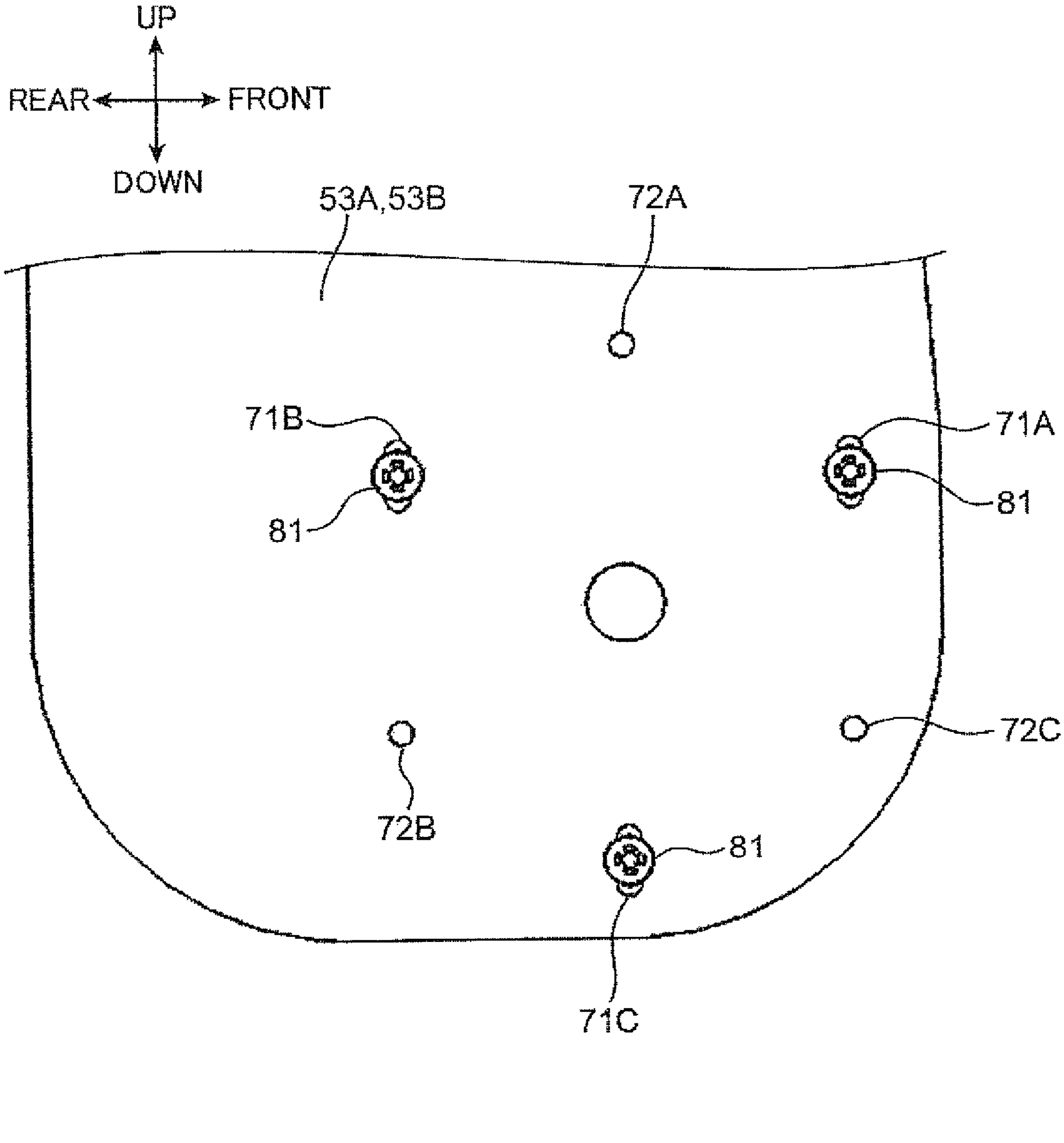
FIG. 12 is a view illustrating the second example when viewed from the other side in the axial direction of the tension roller.

FIGS. 11 and 12 illustrate a second example of the positional adjustment of the tension rollers 51A and 51B. FIG. 11 is a view of the tension rollers 51A and 51B when viewed from one side (right side) in the axial direction, and FIG. 12 is a view of the tension rollers 51A and 51B when viewed from the other side (left side) in the axial direction.

As illustrated in FIGS. 11 and 12, when the pairs of supporting members 52A and 52B take the second posture, the fastening members 81 are inserted in the third insertion holes 62A, 62B, and 62C of the pairs of supporting members 52A and 52B and the second insertion holes 71A, 71B, and 71C of the pairs of tensional force adjusting members 53A and 53B. In this state, the displacement of the tension rollers 51A and 51B along the perpendicular line PL illustrated in FIG. 8 (in the up-and-down direction) is allowed. Accordingly, the positional adjustment of the tension rollers 51A and 51B to make the axial direction of the tension rollers 51A and 51B be parallel to the width direction of the workpiece W can be made easily.

(Third Example of Positional Adjustment of Tension Roller)

Figure 13:
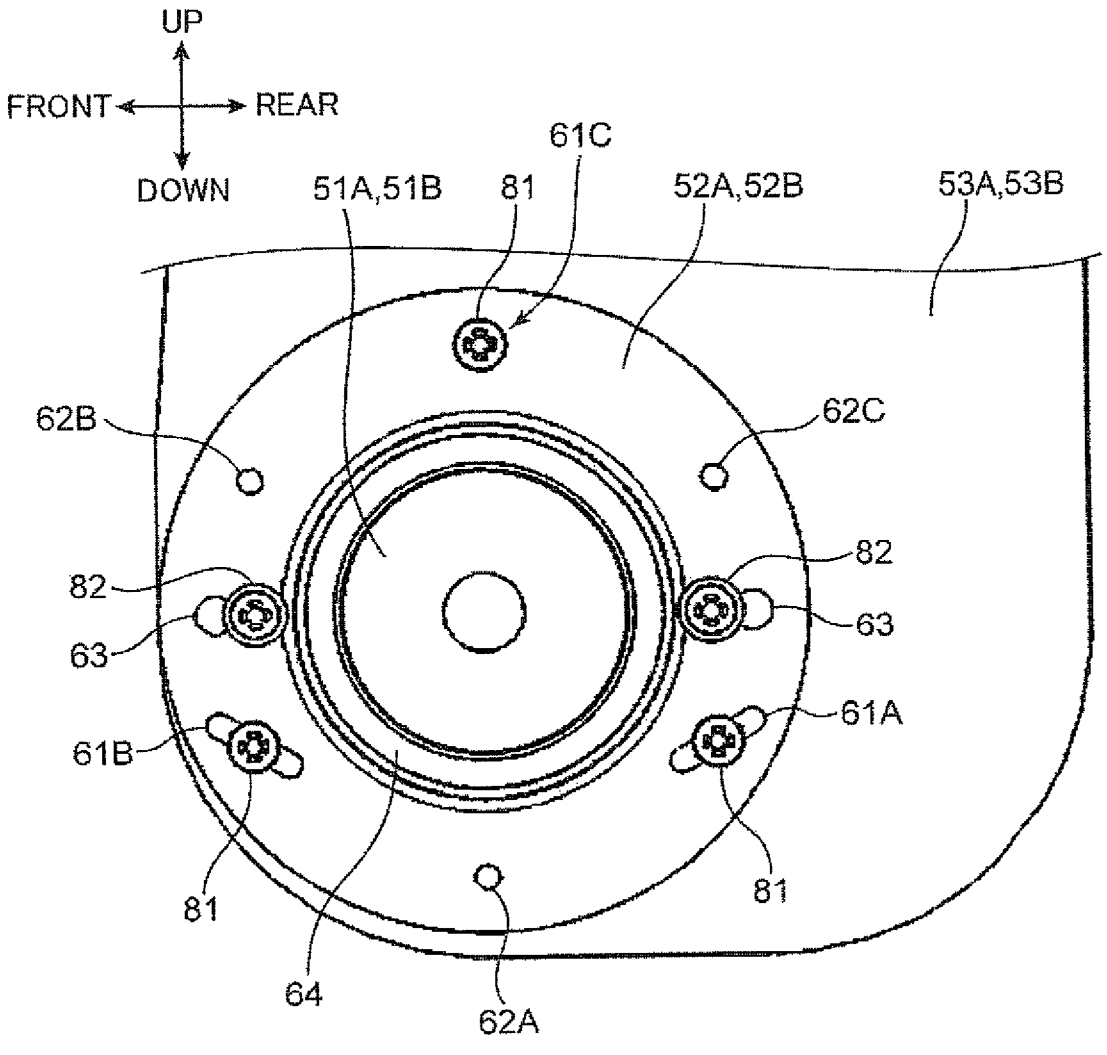
FIG. 13 is a view, when viewed from one side in the axial direction of the tension roller, illustrating a third example of positional adjustment made when the tension roller is attached to a pair of tensional force adjusting members via a pair of supporting members.
Figure 14:
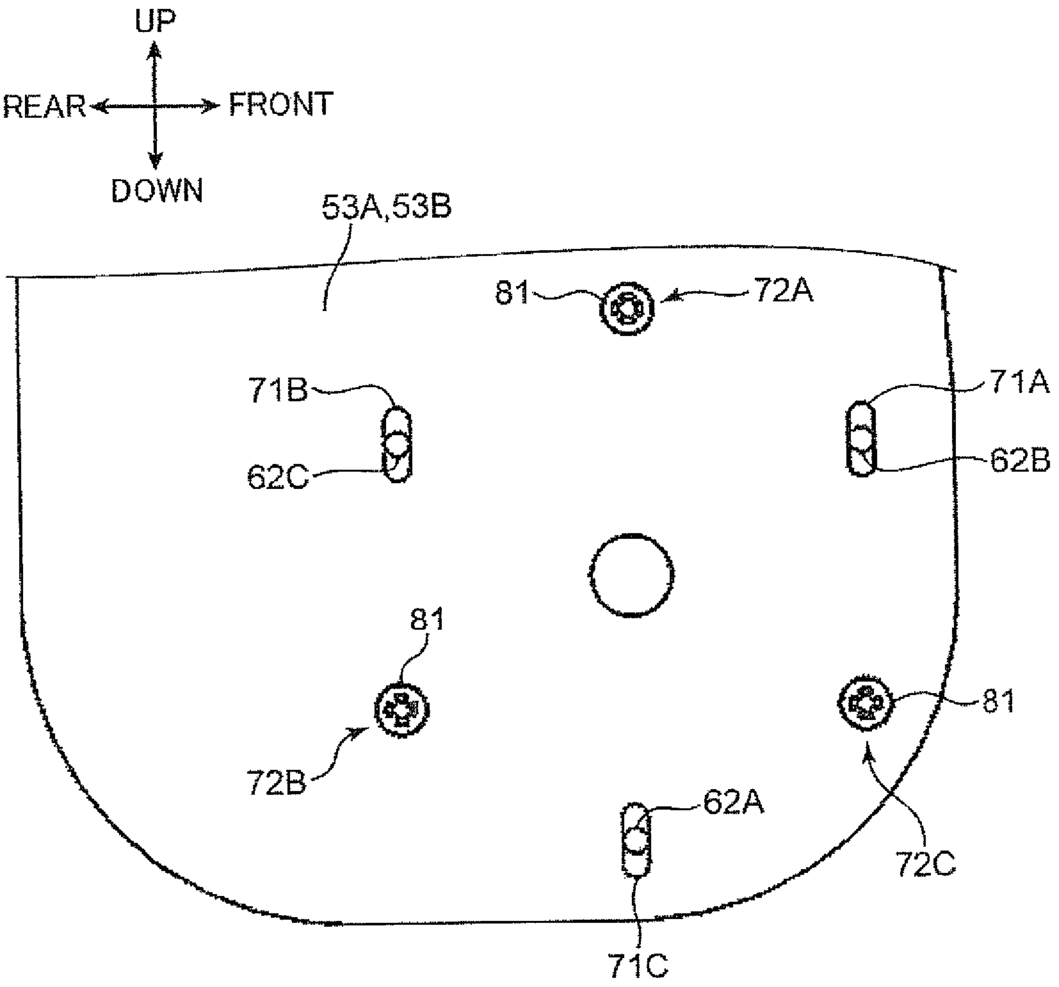
FIG. 14 is a view illustrating the third example when viewed from the other side in the axial direction of the tension roller.

FIGS. 13 and 14 illustrate a third example of the positional adjustment of the tension rollers 51A and 51B. FIG. 13 is a view of the tension rollers 51A and 51B when viewed one side (right side) in the axial direction, and FIG. 14 is a view of the tension rollers 51A and 51B when viewed from the other side (left side) in the axial direction.

As illustrated in FIGS. 13 and 14, when the pairs of supporting members 52A and 52B take the second posture, the fastening members 81 are inserted in the first insertion holes 61A, 61B, and 61C of the pairs of supporting members 52A and 52B and the fourth insertion holes 72A, 72B, and 72C of the pairs of tensional force adjusting members 53A and 53B. In this state, the displacement of the tension rollers 51A and 51B along the arc AR illustrated in FIG. 7 (in the front-and-rear direction) is allowed. Accordingly, the positional adjustment of the tension rollers MA and MB to make the axial direction of the tension rollers MA and MB be parallel to the width direction of the workpiece W can be made easily.

The embodiment of the present invention is described above. The scope of the present invention is not limited to the embodiment and various exemplary modifications, as illustrated below, can be made.

The above embodiment is described for the mode where the image forming device 1 is an ink-jet device. However, the present invention is not limited to such a configuration. The image forming device 1 may include other type of image forming unit which is based on a known electrophotographic technique or the like.

The invention claimed is:

1. A transporting device comprising:

a transport roller that transports a predetermined workpiece in a predetermined transport direction as that the workpiece passes through an image forming position where image forming processing is performed on the workpiece;

a feeding unit including a first support shaft that extends in a width direction of the workpiece perpendicular to the transport direction and supports a first roll that is a rolled body of the workpiece that is to be subjected to the image forming processing, the feeding unit feeding out the workpiece from the first roll on the first support shaft to the transport roller;

a take-up unit including a second support shaft that extends in the width direction of the work piece and supports a second roll that is a rolled body of the workpiece that has been subjected to the image forming processing, the take-up unit taking up the workpiece that has been fed out from the first roll and passed through the transport roller onto the second support shaft, the taken up workpiece forming a portion of the second roll; and a tension mechanism that gives tensional force to the workpiece between the first roll and the second roll, wherein the tension mechanism includes a tension roller having first and second ends spaced apart in an axial direction that extends in the width direction of the work piece and contacts the workpiece to give tensional force to the workpiece, a pair of supporting members each having a form of a plate vertical to the tension roller, and including a first supporting member that supports the first axial end of the tension roller, and a second supporting member that supports the second axial end of the tension roller, and a pair of tensional force adjusting members including a first tensional force adjusting member to which the first supporting member is fastened by fastening members at the first end of the tension roller, and a second tensional force adjusting member to which the second supporting member is fastened by fastening members at the second end of the tension roller, the tension roller being moved by pivoting the first and second tensional force adjusting members about each axis thereof extending in the width direction of the work piece to adjust the tensional force given to the workpiece, and the first supporting member and the first tensional force adjusting member are arranged in the axial direction of the tension roller, and the second supporting member and the second tensional force adjusting member are arranged in the axial direction of the tension roller, and each of the first supporting member, the first tensional force adjusting member, the second supporting member and the second tensional force adjusting member includes elongate insertion holes into which the fastening members are inserted, the insertion holes each extending in a direction intersecting the axial direction of the tension roller.

2. The transporting device according to claim 1, wherein each of the elongate insertion holes of the pair of supporting members extends in a direction intersecting a direction in which each of the elongate insertion holes of the pair of tensional force adjusting members extends.

3. The transporting device according to claim 2, wherein the first supporting member is fastened to the first tensional force adjusting member by the fastening members at three locations, and the second supporting member is fastened to the second tensional force adjusting member by the fastening members at three locations, the first and second supporting members each include three first insertion holes as the insertion holes in which the fastening members are inserted, the three first insertion holes being situated respectively at a first vertex, a second vertex, and a third vertex of a first virtual equilateral triangle that has its gravity center on a shaft center of the tension roller, the first tensional force adjusting member and the second tensional force adjusting member each include three second insertion holes as the insertion holes in which the fastening members are inserted, the three second insertion holes being situated respectively at the first vertex, the second vertex, and the third vertex of the first virtual equilateral triangle, the first insertion holes situated at the first vertex and the second vertex are elongate holes extending along an arc having its center on the third vertex, and the first insertion hole situated at the third vertex is a round hole, and the three second insertion holes are elongate holes extending along a perpendicular line dropped from the third vertex to an edge connecting the first vertex and the second vertex.

4. The transporting device according to claim 3, wherein the first supporting member and the second supporting member each further include three round third insertion holes as the insertion holes in which the fastening members are inserted, the three third insertion holes being situated at vertices of a second virtual equilateral triangle given by rotating the first virtual equilateral triangle 60 degrees about the gravity center, the first tensional force adjusting member and the second tensional force adjusting member each further include three round fourth insertion holes as the insertion holes in which the fastening members are inserted, the three fourth insertion holes being situated at the vertices of the second virtual equilateral triangle, the first or the second supporting member is configured to be fastened to the first or second tensional force adjusting member by the fastening members at three locations with the first or second supporting member taking a first posture or a second posture which is taken by rotating the first or second supporting member taking the first posture 180 degrees about the shaft center of the tension roller, when the first or second supporting member takes the first posture, the fastening members are inserted in the first insertion holes and the second insertion holes, and when the first or second supporting member takes the second posture, the fastening members are inserted in the third insertion holes and the second insertion holes or otherwise in the first insertion holes and the fourth insertion holes.

5. An image forming device comprising:

an image forming unit that performs image forming processing on a predetermined workpiece; and the transporting device according to claim 1 that transports the workpiece so as to pass through an image forming position opposing the image forming unit.

* * * * *